(12) United States Patent
Baker et al.

(10) Patent No.: US 11,414,195 B2
(45) Date of Patent: Aug. 16, 2022

(54) SURFACE MODIFIED HEATER ASSEMBLY

(71) Applicant: Rosemount Aerospace Inc., Burnsville, MN (US)

(72) Inventors: Mark Baker, Savage, MN (US); Matthew Kulhanek, Apple Valley, MN (US); Mark Stephen Lopac, Cokato, MN (US); Colin E. Towne, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 626 days.

(21) Appl. No.: 15/934,206

(22) Filed: Mar. 23, 2018

(65) Prior Publication Data

US 2019/0291879 A1    Sep. 26, 2019

(51) Int. Cl.
| | | |
|---|---|---|
| *B64D 15/12* | (2006.01) | |
| *G01P 5/16* | (2006.01) | |
| *B23K 1/00* | (2006.01) | |

(52) U.S. Cl.
CPC ............ *B64D 15/12* (2013.01); *B23K 1/0016* (2013.01); *G01P 5/16* (2013.01)

(58) Field of Classification Search
CPC .......... B64D 15/12; B23K 1/0016; G01P 5/16
USPC .............................. 219/202; 374/138; 73/182
See application file for complete search history.

(56) References Cited

U.S. PATENT DOCUMENTS

| | | | |
|---|---|---|---|
| 2,254,155 A | 8/1941 | Reichel | |
| 2,343,282 A | 3/1944 | Daiber | |
| 2,381,327 A | 8/1945 | Woodman et al. | |
| 2,393,593 A | 1/1946 | Daiber | |
| 2,399,370 A | 4/1946 | McOrlly | |
| 2,428,542 A | 10/1947 | Bernhardt | |
| 2,601,331 A | 6/1952 | Segal | |
| 2,640,347 A | 6/1953 | Majeski | |
| 2,984,107 A | 5/1961 | Strieby et al. | |
| 2,987,565 A | 6/1961 | Barnhart et al. | |
| 3,138,025 A | 6/1964 | Fingerson | |
| 3,267,992 A | 8/1966 | Werner et al. | |
| 3,400,583 A | 9/1968 | Newport et al. | |

(Continued)

FOREIGN PATENT DOCUMENTS

| | | |
|---|---|---|
| CN | 2420633 Y | 2/2001 |
| CN | 102735888 A | 10/2012 |

(Continued)

OTHER PUBLICATIONS

Extended European Search Report for European Patent Application No. 19207424.3, dated Mar. 13, 2020, 8 pages.

(Continued)

*Primary Examiner* — Tu B Hoang
*Assistant Examiner* — Alba T Rosario-Aponte
(74) *Attorney, Agent, or Firm* — Kinney & Lange, P.A.

(57) ABSTRACT

An air data probe includes a probe head having an interior surface defining a cavity, a component positioned within the cavity of the probe head, a plurality of protrusions defining contact between the interior surface of the probe head and a peripheral surface of the component prior to brazing the component to the probe head, and a braze material located between the interior surface of the probe head and the peripheral surface of the component as a result of brazing the component to the probe head.

5 Claims, 9 Drawing Sheets

(56) References Cited

U.S. PATENT DOCUMENTS

| | | | |
|---|---|---|---|
| 3,535,930 | A | 10/1970 | Rees |
| 3,590,460 | A | 7/1971 | Highducheck |
| 3,885,613 | A | 5/1975 | Evans |
| 4,152,938 | A * | 5/1979 | Danninger ............ G01K 13/028 374/138 |
| 4,312,120 | A | 1/1982 | Comer |
| 4,615,213 | A | 10/1986 | Hagan |
| 4,836,019 | A | 6/1989 | Hagen et al. |
| 5,025,661 | A | 6/1991 | McCormack |
| 5,046,360 | A | 9/1991 | Hedberg |
| 5,062,869 | A | 11/1991 | Hagen |
| 5,099,686 | A * | 3/1992 | Kohler .................... G01P 5/165 73/180 |
| 5,130,707 | A | 7/1992 | Hagen |
| 5,220,319 | A | 6/1993 | Kendel |
| 5,228,563 | A | 7/1993 | Stringham |
| 5,232,086 | A | 8/1993 | Montanari |
| 5,392,622 | A | 2/1995 | O'Donnell |
| 5,423,209 | A * | 6/1995 | Nakaya ..................... G01F 1/46 73/182 |
| 5,458,008 | A | 10/1995 | Rassatt |
| 5,460,022 | A | 10/1995 | Parsons |
| 5,466,067 | A | 11/1995 | Hagen et al. |
| 5,487,291 | A | 1/1996 | Voigt |
| 5,495,942 | A | 3/1996 | Izhak |
| 5,543,183 | A | 8/1996 | Streckert et al. |
| 5,621,936 | A | 4/1997 | Penaligon |
| 5,639,964 | A | 6/1997 | Djorup |
| 5,653,538 | A | 8/1997 | Phillips |
| 5,731,507 | A | 3/1998 | Hagen et al. |
| 5,740,857 | A | 4/1998 | Thompson et al. |
| 6,062,869 | A | 5/2000 | Mizobuchi et al. |
| 6,070,475 | A | 6/2000 | Muehlhauser et al. |
| 6,079,845 | A | 6/2000 | Kreider |
| 6,237,756 | B1 | 5/2001 | Caudle |
| 6,323,420 | B1 | 11/2001 | Head |
| 6,371,286 | B1 | 4/2002 | Montanari |
| 6,419,186 | B1 | 7/2002 | Bachinski et al. |
| D463,989 | S | 10/2002 | Bachinski et al. |
| 6,550,344 | B2 | 4/2003 | Bachinski et al. |
| 6,591,696 | B2 | 7/2003 | Bachinski |
| 6,612,166 | B2 | 9/2003 | Golly et al. |
| 6,648,939 | B2 | 11/2003 | Neuschwander et al. |
| 6,740,857 | B1 | 5/2004 | Furlong et al. |
| 6,813,942 | B1 | 11/2004 | Vozhdaev et al. |
| 6,840,672 | B2 | 1/2005 | Ice et al. |
| 6,892,584 | B2 | 5/2005 | Gilkison et al. |
| 6,941,805 | B2 | 9/2005 | Seidel et al. |
| 7,370,526 | B1 | 5/2008 | Ice |
| 7,483,223 | B2 | 1/2009 | Egle et al. |
| 7,549,331 | B1 | 6/2009 | Powell |
| 7,597,018 | B2 | 10/2009 | Braun et al. |
| 7,705,275 | B2 | 4/2010 | Umotoy et al. |
| 7,716,980 | B1 | 5/2010 | Colten et al. |
| 7,915,567 | B2 | 3/2011 | Lhuillier |
| 7,937,977 | B2 | 5/2011 | Booker |
| 8,060,334 | B1 | 11/2011 | Jarvinen |
| 8,225,696 | B2 | 7/2012 | Downes |
| 8,341,989 | B1 | 1/2013 | Hamblin et al. |
| 8,365,591 | B2 | 2/2013 | Golly |
| 8,485,007 | B2 | 7/2013 | Downes |
| 8,718,955 | B2 | 5/2014 | Golly et al. |
| 8,857,255 | B2 | 10/2014 | Anderson et al. |
| 9,080,903 | B2 | 7/2015 | Ashton |
| 9,207,253 | B2 | 12/2015 | Seidel et al. |
| 9,279,684 | B2 | 3/2016 | Marty et al. |
| 9,366,555 | B2 | 6/2016 | Schober et al. |
| 9,541,429 | B2 | 1/2017 | Farokhi et al. |
| 9,664,542 | B2 | 5/2017 | Gordon et al. |
| 9,719,820 | B1 | 8/2017 | Jacob et al. |
| 9,722,345 | B2 | 8/2017 | Amesson et al. |
| 9,772,345 | B2 | 9/2017 | Golly et al. |
| 9,791,304 | B2 | 10/2017 | Wong et al. |
| 9,856,027 | B2 | 1/2018 | Anderson et al. |
| 9,891,083 | B2 | 2/2018 | Gordon et al. |
| 9,918,524 | B2 | 3/2018 | Byrd et al. |
| 9,976,882 | B2 | 5/2018 | Seidel et al. |
| 10,024,877 | B2 | 7/2018 | Golly et al. |
| 10,040,570 | B2 | 8/2018 | Heuer et al. |
| 10,227,139 | B2 | 3/2019 | Golly et al. |
| 10,234,475 | B2 | 3/2019 | Sarno et al. |
| 10,281,303 | B2 | 5/2019 | Johnson et al. |
| 10,384,787 | B2 | 8/2019 | Gordon et al. |
| 10,605,637 | B2 | 3/2020 | Gordon et al. |
| 10,613,112 | B2 | 4/2020 | Golly et al. |
| 10,884,014 | B2 | 1/2021 | Golly et al. |
| 10,955,433 | B2 | 3/2021 | Jacob et al. |
| 11,167,861 | B2 | 11/2021 | Golly et al. |
| 2004/0085211 | A1 | 5/2004 | Gotfried |
| 2004/0093953 | A1 | 5/2004 | Gilkison et al. |
| 2004/0177683 | A1 | 9/2004 | Ice |
| 2004/0244477 | A1 | 12/2004 | Zippold et al. |
| 2005/0011285 | A1 | 1/2005 | Giterman |
| 2005/0179542 | A1 | 8/2005 | Young |
| 2006/0144007 | A1 | 7/2006 | Azarin |
| 2006/0207753 | A1 | 9/2006 | Sanatgar et al. |
| 2007/0079639 | A1 | 4/2007 | Hsu |
| 2010/0000885 | A1 | 1/2010 | Downes |
| 2010/0123549 | A1 | 5/2010 | Lickfelt et al. |
| 2011/0036160 | A1 | 2/2011 | Pineau et al. |
| 2012/0280498 | A1 | 11/2012 | Irwin et al. |
| 2013/0014586 | A1 | 1/2013 | Walling et al. |
| 2013/0145862 | A1 | 6/2013 | Leblond et al. |
| 2014/0053644 | A1 | 2/2014 | Anderson et al. |
| 2014/0156226 | A1 | 6/2014 | Hashemian et al. |
| 2014/0332192 | A1 | 11/2014 | Cosby, II et al. |
| 2015/0356393 | A1 | 12/2015 | Daoura et al. |
| 2016/0091355 | A1 | 3/2016 | Mesnard et al. |
| 2016/0280391 | A1 * | 9/2016 | Golly ..................... G01L 19/04 |
| 2017/0052046 | A1 | 2/2017 | Gordon et al. |
| 2017/0086656 | A1 | 3/2017 | Hiratsuka |
| 2017/0092030 | A1 | 3/2017 | Badger, II |
| 2017/0108360 | A1 | 4/2017 | Wong et al. |
| 2017/0110838 | A1 | 4/2017 | Sasaki |
| 2017/0115139 | A1 * | 4/2017 | Wong ........................ G01F 1/46 |
| 2017/0169974 | A1 | 6/2017 | Miyakawa et al. |
| 2017/0199063 | A1 * | 7/2017 | Gordon ................ B23K 1/0008 |
| 2017/0256340 | A1 | 9/2017 | dos Santos e Lucato et al. |
| 2017/0369175 | A1 * | 12/2017 | Gordon .................... G01P 5/165 |
| 2018/0128849 | A1 | 5/2018 | Wong et al. |
| 2018/0175518 | A1 | 6/2018 | Mori et al. |
| 2018/0209863 | A1 | 7/2018 | Golly et al. |
| 2018/0259547 | A1 | 9/2018 | Abdullah et al. |
| 2018/0259548 | A1 | 9/2018 | Anderson et al. |
| 2019/0186974 | A1 | 6/2019 | Golly et al. |
| 2019/0234986 | A1 | 8/2019 | Ortelt |
| 2019/0383848 | A1 | 12/2019 | Matheis et al. |
| 2020/0109982 | A1 | 4/2020 | Jacob et al. |
| 2020/0114428 | A1 | 4/2020 | Golly et al. |
| 2020/0123650 | A1 | 4/2020 | Poteet et al. |
| 2020/0141964 | A1 | 5/2020 | Marty et al. |
| 2020/0233007 | A1 | 7/2020 | Jacob et al. |
| 2020/0309808 | A1 | 10/2020 | Golly et al. |
| 2021/0022215 | A1 | 1/2021 | Jacob et al. |
| 2021/0048322 | A1 | 2/2021 | Poteet et al. |
| 2021/0055143 | A1 | 2/2021 | Wigen et al. |
| 2021/0127458 | A1 | 4/2021 | Jacob et al. |
| 2021/0140989 | A1 | 5/2021 | Buenz et al. |
| 2022/0024602 | A1 | 1/2022 | Golly et al. |

FOREIGN PATENT DOCUMENTS

| | | |
|---|---|---|
| EP | 0737315 A1 | 10/1996 |
| EP | 3073275 A2 | 9/2016 |
| EP | 3076185 A1 | 10/2016 |
| EP | 3133403 A1 | 2/2017 |
| EP | 3159700 A1 | 4/2017 |
| EP | 3214704 A1 | 9/2017 |
| EP | 3499217 A2 | 6/2019 |
| GB | 562880 | 7/1944 |
| GB | 1118794 | 7/1968 |
| WO | WO9613727 A1 | 5/1996 |
| WO | WO9816837 A1 | 4/1998 |

(56) References Cited

FOREIGN PATENT DOCUMENTS

| | | |
|---|---|---|
| WO | WO0111582 A1 | 2/2001 |
| WO | WO0167115 A2 | 9/2001 |
| WO | WO0177622 A2 | 10/2001 |

OTHER PUBLICATIONS

Bifilar Coil, Wikipedia, as captured by the Internet Archive on Aug. 2, 2015, 3 pages.
Extended European Search Report for European Patent Application No. 18207317.1, dated May 24, 2019, 7 pages.
Extended European Search Report for European Patent Application No. 19213580.4, dated Jun. 26, 2020, 13 pages.
Extended European Search Report for European Patent Application No. 19215840.0, dated Jul. 3, 2020, 14 pages.

\* cited by examiner

SURFACE MODIFIED HEATER ASSEMBLY

BACKGROUND

The present disclosure relates generally to air data probes, and in particular, to heaters of air data probes.

Air data probes are installed on aircraft to gather pneumatic pressures that permit the measurement of air data parameters, such as speed, altitude, and angle of attack. Air data probes are exposed to the environmental conditions exterior to the aircraft, which are often cold. As such, heaters are positioned within air data probes to ensure the air data probes function properly. The heater is generally connected to an interior surface of a probe head of the air data probe. It can be difficult to successfully connect the heater to the probe head.

SUMMARY

An air data probe includes a probe head having an interior surface defining a cavity, a component positioned within the cavity of the probe head, a plurality of protrusions defining contact between the interior surface of the probe head and a peripheral surface of the component prior to brazing the component to the probe head, and a braze material located between the interior surface of the probe head and the peripheral surface of the component as a result of brazing the component to the probe head.

A method for connecting a component of an air data probe to an interior surface of a probe head of the air data probe includes sliding the component into a cavity of the probe head such that a plurality of protrusions define contact between a peripheral surface of the component and an interior surface of the probe head and brazing the component to the probe head to join an entirety of the peripheral surface of the component to the probe head.

DETAILED DESCRIPTION

In general, the present disclosure describes a heater of an air data probe that includes protrusions to increase the points or lines of contact and eliminate large gaps between the heater and an internal surface of a probe head, allowing the heater to slide into the probe head more easily and improving the brazing of the heater to the internal surface of the probe head. Alternatively, the internal surface of the probe head may include protrusions to increase the points or lines of contact and eliminate large gaps between the heater and the internal surface of the probe head.

Figure 1:
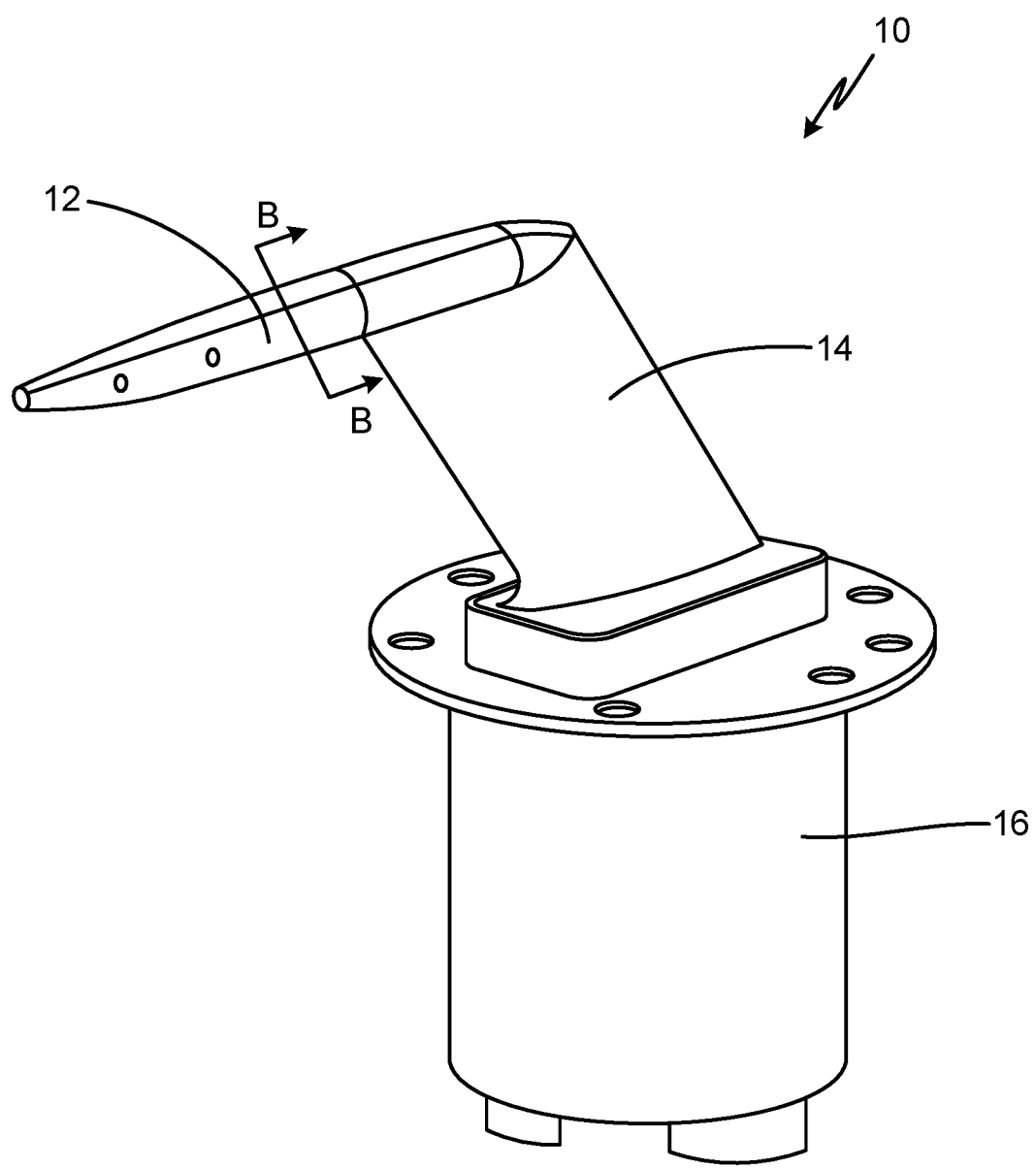
FIG. 1 is a perspective view of an air data probe.

FIG. 1 is a perspective view of air data probe 10. Air data probe 10 includes probe head 12, strut 14, and housing 16.

Probe head 12 is connected to a first end of strut 14. Probe head 12 is the sensing head of air data probe 10. Probe head 12 has one or more ports positioned in probe head 12. Internal components of air data probe 10 are located within probe head 12. A second end of strut 14 is connected to housing 16. As such, strut 14 connects probe head 12 to housing 16. Strut 14 is blade-shaped. Internal components of air data probe 10 are located within strut 14. Housing 16 may also contain internal components, such as sensors or other electronics, of air data probe 10. In alternate embodiments, air data probe 10 may not include housing 16.

Air data probe 10 is installed on an aircraft. Air data probe 10 may be mounted to a fuselage of the aircraft via fasteners, such as screws or bolts. Strut 14 holds probe head 12 away from the fuselage of the aircraft to expose probe head 12 to the oncoming airflow outside of the boundary layer. Probe head 12 takes in air from surrounding airflow via the one or more ports positioned in probe head 12. Air pressures from probe head 12 are communicated pneumatically through internal components and passages of probe head 12 and strut 14 to reach internal components within housing 16. Pressure sensors and/or other components within housing 16, or elsewhere in the aircraft, measure the air pressures provided by probe head 12. Air data probe 10 uses the pressure measurements to generate air data parameters related to the aircraft flight condition, such as the speed, altitude, or angle of attack of the aircraft.

Figure 2A:
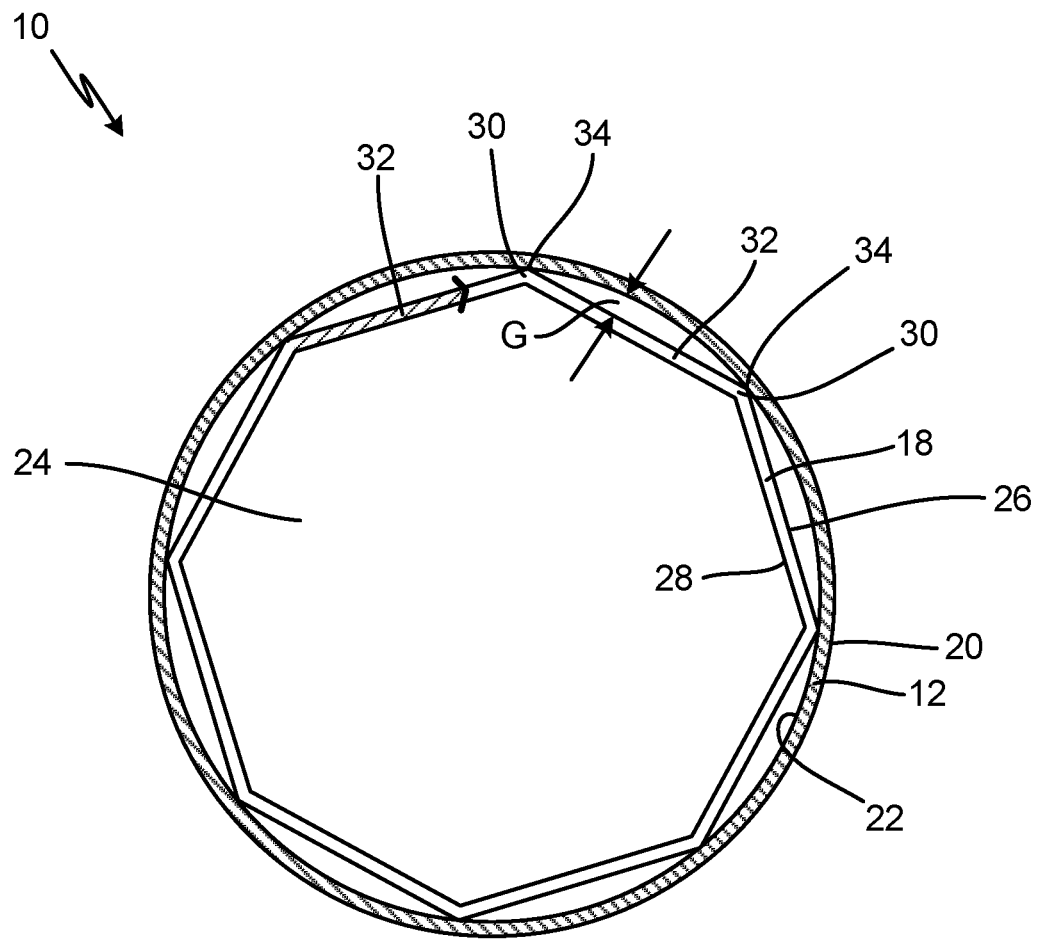
FIG. 2A is a cross-sectional view of the air data probe taken along line B-B of FIG. 1 showing a heater of the air data probe prior to brazing.
Figure 2B:
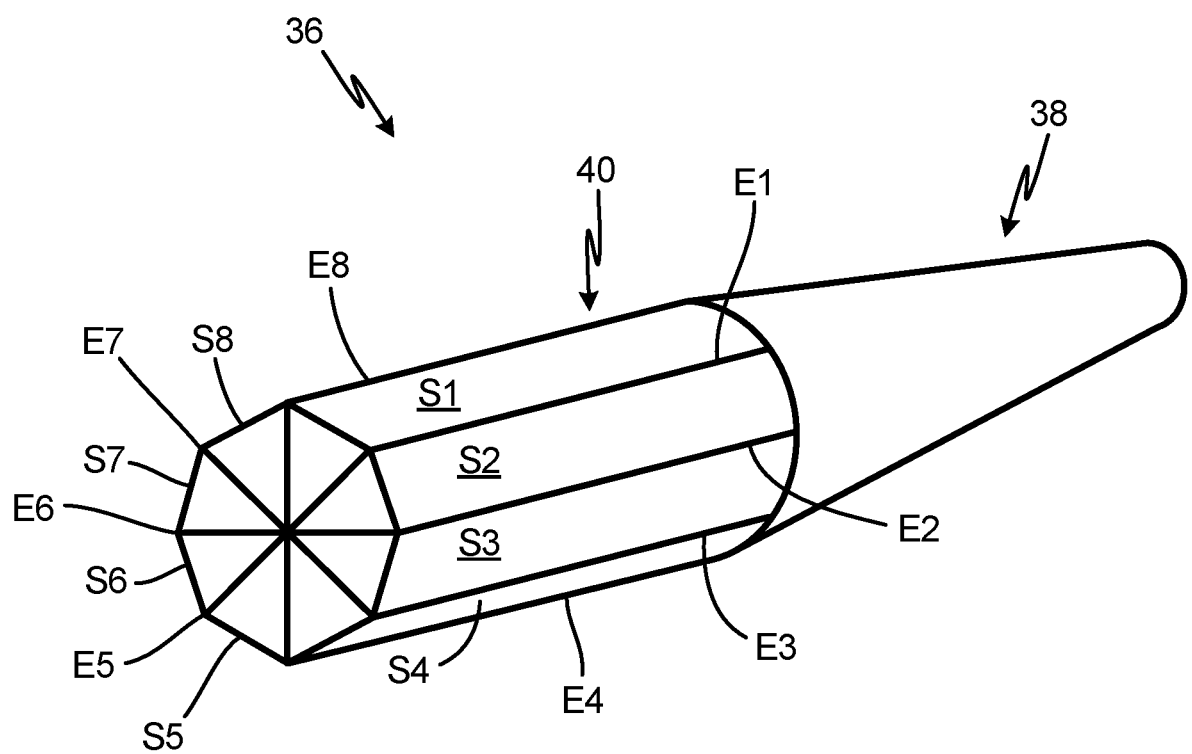
FIG. 2B is a perspective view of a mandrel for forming the heater of FIG. 1B.
Figure 2C:
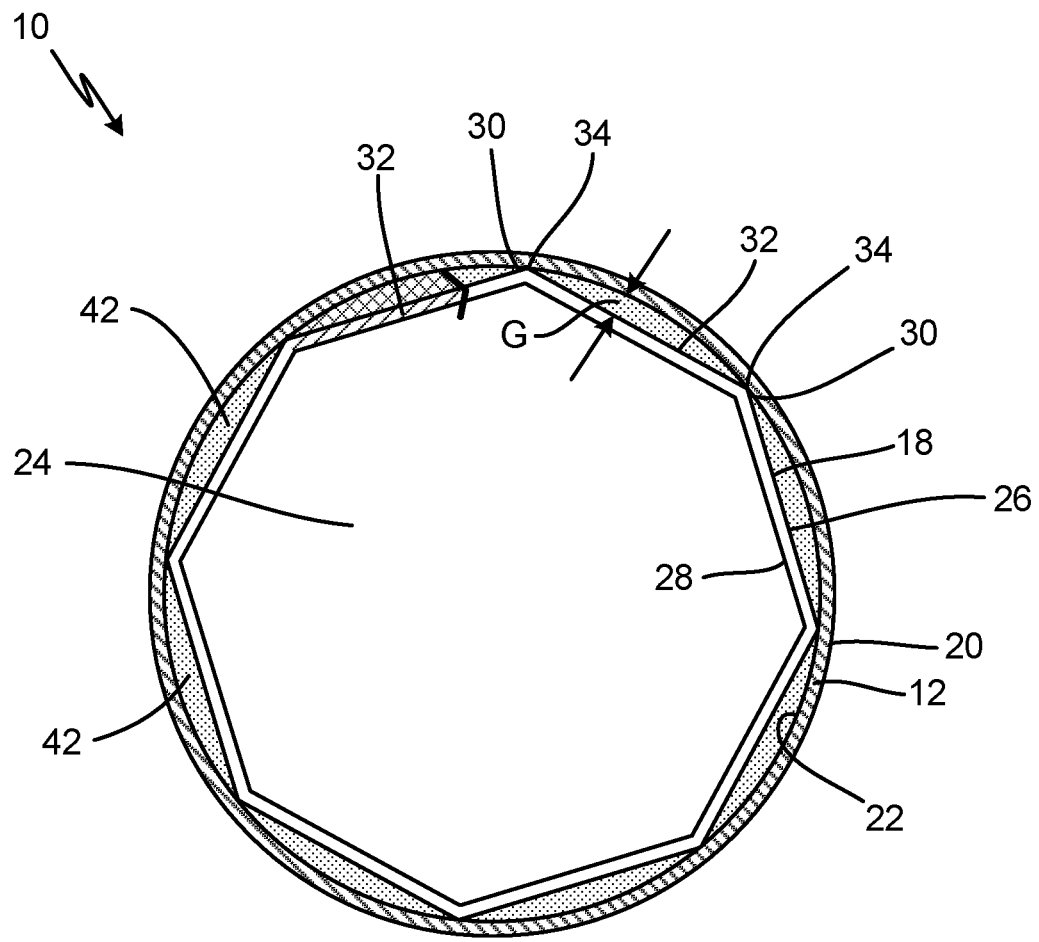
FIG. 2C is a cross-sectional view of the air data probe of FIG. 2A showing the heater of the air data probe after brazing.

FIG. 2A is a cross-sectional view of air data probe 10 taken along line B-B of FIG. 1 showing heater 18 of air data probe 10 prior to brazing. All other interior components of air data probe 10 have been omitted for clarity. FIG. 2B is a perspective view of mandrel 36 for forming heater 18 of FIG. 1B. FIG. 2C is a cross-sectional view of air data probe 10 of FIG. 2A showing heater 18 of air data probe 10 after brazing. FIGS. 2A, 2B, and 2C will be discussed together. Air data probe 10 includes probe head 12, heater 18, and braze material 42. Probe head 12 includes exterior surface 20, interior surface 22, and cavity 24. Heater 18 includes peripheral surface 26, interior surface 28, points 30, straight portions 32, and protrusions 34. Mandrel 36 includes first portion 38 and second portion 40. Second portion 40 includes sides S (S1, S2, S3, S4, S5, S6, S7, and S8) and edges E (E1, E2, E3, E4, E5, E6, E7, E8).

Probe head 12 is hollow and substantially cylindrical. In this embodiment, probe head 12 is made of a nickel alloy. In alternate embodiments probe head 12 may be made of any suitable material. Probe head 12 has exterior surface 20 at an exterior of probe head 12 and interior surface 22 at an interior of probe head 12. Interior surface 22 of probe head 12 defines cavity 24 of probe head 12. Cavity 24 is the space within hollow probe head 12. Cavity 24 extends from a first end of probe head 12 to a second end of probe head 12.

Heater 18 of air data probe 10 is a wire-like component of air data probe 10. Heater 18 is an electrical heater with a heating element that is wound in a helical pattern. Helical heater 18 is positioned within cavity 24 of probe head 12. As such, heater 18 is shaped to correspond with the size of cavity 24 of probe head 12. Heater 18 extends through cavity 24 and into strut 14 (shown in FIG. 1) and housing 16 (shown in FIG. 1) where heater 18 may connect with electrical components, such as a lead wires. In this embodiment, heater 18 is made of a nickel alloy. In alternate embodiments, heater 18 may be made of any suitable material.

Heater 18 has peripheral surface 26 at a periphery of heater 18. Peripheral surface 26 is an outer surface of helically wound heater 18. As such, when heater 18 is positioned within probe head 12, peripheral surface 26 is the surface of heater 18 closest to interior surface 22 of probe head 12. Heater 18 has interior surface 28 opposite peripheral surface 26. Interior surface 28 is an inner surface of helically wound heater 18. As such, when heater 18 is positioned within probe head 12, interior surface 28 is the surface of heater 18 farthest from interior surface 22 of probe head 12.

Heater 18 is shaped to have a series of points 30 between straight portions 32, each point 30 being between two straight portions 32. Points 30 are pointed portions of helically wound heater 18, and straight portions 32 are substantially straight portions, or linear portions, of helically wound heater 18 that connect points 30. As such, heater 18 has a polygonal cross-sectional profile. For example, heater 18 may have an octagonal profile as shown in FIGS. 2A and 2C. Points 30 define protrusions 34 of heater 18. Protrusions 34 define contact between peripheral surface 26 of heater 18 and interior surface 22 of probe head 12 prior to brazing heater 18 to probe head 12. Protrusions 34 are a series of spaced apart portions of heater 18 that stick out toward interior surface 22 of probe head 12 and make direct physical contact with interior surface 22 of probe head 12 when heater 18 is inserted in probe head 12. As such, protrusions 34 form, or define, points of contact, or points of interference, between peripheral surface 26 of heater 18 and interior surface 22 of probe head 12 prior to brazing heater 18 to probe head 12, as shown in FIG. 2A. As a result, gap G is formed between peripheral surface 26 of heater 18 and interior surface 22 of probe head 12. Gap G extends along an entirety of peripheral surface 26 of heater 18. As such, gap G also has a helical pattern. Gap G varies in width due to the polygonal cross-sectional shape of heater 18 and annular shape of probe head 12. For example, gap G has a width of zero at protrusions 34 of heater 18. A maximum width of gap G is formed between peripheral surface 26 of a middle of straight portion 32 of heater 18 and interior surface 22 of probe head 12. Maximum width of gap G is between about 0.001 inch (25.4 microns) and about 0.003 inch (76.2 microns), and is preferably about 0.001 inch (25.4 microns). Heater 18 is formed to have a maximum amount of protrusions 34, or points of contact with interior surface 22 of probe head 12, while maintaining an acceptable maximum width of gap G. As shown in FIG. 2A, prior to brazing, gap G is an empty space between peripheral surface 26 of heater 18 and interior surface 22 of probe head 12. After brazing, as shown in FIG. 2C, gap G is completely filled by braze material 42 as a result of brazing heater 18 to probe head 12.

Mandrel 36, shown in FIG. 2B, is used to shape, or form, heater 18. Mandrel 36 has first portion 38 extending from a first end of mandrel 36 and second portion 40 extending from a second end of mandrel 36. First portion 38 is connected to second portion 40. Second portion 40 of mandrel 36 is sized to correspond with the size of cavity 24 of probe head 12. Second portion 40 is multi-sided. Second portion 40 has flat sides S connected to each other at edges E. As such, second portion 40 has a polygonal cross-sectional profile. Second portion 40 of mandrel 36 is shaped to correspond with the desired polygonal cross-sectional profile of heater 18. As such, mandrel 36 may have any number of sides S and edges E to correspond with the desired cross-sectional profile of heater 18. For example, second portion 40 may have an octagonal profile, as shown in FIG. 2B, to form heater 18 having an octagonal profile, as shown in FIG. 2A. In the embodiment shown in FIG. 2B, edge E1 is between side S1 and side S2. Edge E2 is between side S2 and side S3. Edge E3 is between side S3 and side S4. Edge E4 is between side S4 and side S5. Edge E5 is between side S5 and side S6. Edge E6 is between side S6 and side S7. Edge E7 is between side S7 and side S8. Edge E8 is between side S8 and side S1. Edges E connect sides S that edges E are between.

Heater 18 is wrapped, or wound, length-wise around and along second portion 40 of mandrel 36 to shape heater 18. Heater 18 is shaped to have a helical pattern. As heater 18 is wrapped around second portion 40 of mandrel, sides S form straight portions 32, and edges E form points 30 of heater 18. After heater 18 is formed to have a helical shape with protrusions 34, heater 18 is inserted, or slid, into probe head 12. Once within probe head 12, the position of heater 18 may be adjusted within probe head 12. A borescope may be used to visually align heater 18 within probe head 12. Further, an x-ray may be used to confirm proper positioning of heater 18 within probe head 12. Once heater 18 is in the proper position, braze material 42 is added to cavity 24 of probe head 12. Heater 18 is then vacuum brazed to interior surface 22 of probe head 12. During brazing, braze material 42 becomes fluid and moves into gap G, or between peripheral surface 26 of heater 18 and interior surface 22 of probe head 12. Braze material 42 is then cooled and solidifies adjacent peripheral surface 26, as shown in FIG. 2C. More specifically, braze material 42 solidifies between an entirety of peripheral surface 26 of heater 18 and interior surface 22 of probe head 12 so that gap G is completely filled with braze material 42 and no spaces remain between peripheral surface 26 of heater 18 and interior surface 22 of probe head 12. As a result, braze material 42 joins, or holds, heater 18 to interior surface 22 of probe head 12 at protrusions 34.

Heater 18 prevents ice from accumulating on exterior surface 20 of air data probe 10 and keeps water out of cavity 24 of air data probe 10. Protrusions 34 of heater 18 make it easier to insert, or slide, heater 18 into probe head 12. Protrusions 34 of heater 18 give heater 18 an interference fit within probe head 12 when heater 18 is inserted into probe head 12. Brazing heater 18 to probe head 12 holds heater 18 in a proper position within probe head 12. Protrusions 34 increase points of contact and ensures proper force between probe head 12 and heater 18 to allow for the formation of a thermal circuit, or thermal conductivity between probe head 12 and heater 18, during brazing of heater 18 to probe head 12. Heater 18 having maximum points of contact with interior surface 22 of probe head 12 allows for optimal thermal conductivity. Maintaining an acceptable gap G enables braze material 42 to flow to desired areas during the brazing process. As a result of optimal thermal conductivity and proper flow of braze material 42 into gap G, the entirety of peripheral surface 26 of heater 18 brazes to interior surface 22 of probe head 12, eliminating empty spaces between peripheral surface 26 and heater 18 that may cause heater 18 to overheat and become damaged.

Brazing of heaters by vacuum furnace processes requires contact between heater 18 and probe head 12 because such contact allows for a thermal circuit to be formed between heater 18 and probe head 12. A thermal circuit, or thermal conductivity between heater 18 and probe head 12, is required for proper brazing as it ensures heater 18 and probe head 12 are at the same temperature. Protrusions 34 defining contact between interior surface 22 of probe head 12 and peripheral surface 26 of heater 18 allow both probe head 12 and heater 18 to attain the same temperature to support the brazing. As a result, heater 18 and interior surface 22 of probe head 12 can attain the proper brazing melting temperature.

Traditionally, heaters are coiled with a circular cross-sectional profile. As such, traditional heaters are wound on a mandrel with a circular, or round, cross-sectional profile. Probe heads also traditionally have smooth interior surfaces and circular cross-sectional profiles. Because of their shape, traditional heaters can have a poor fit within the probe head. For example, such heaters may have a partial interference fit without any defined points of interference between the heater and the interior surface of the probe head. As a result, long portions of heaters may be at different temperatures and such temperatures may be different than the temperature required for melting the braze material. Traditional heaters can also get hung up on the interior surface of the probe head as the heater is being slid into the probe head due to the shape of the heater. Further, because of the shapes of traditional heaters and probe heads, large gaps between the peripheral surface of the heater and the interior surface of the probe head often result. When gaps between the heater and the probe head are more than 0.003 inch (0.00762 centimeter), it may be difficult or impossible for the braze material to flow into the gap. Thus, the heater will not braze to the probe head or will not be completely attached to the interior surface of the probe head after the brazing process. If the brazing of such heaters is unsuccessful, the heaters require reworking or scrapping.

Protrusions 34 help heater 18 slide into probe head 12 more easily, resulting in faster and easier assembly or installation. Heater 18 has a superior interference fit within probe head 12, allowing for protrusions 34 to contact interior surface 22 of probe head 12. Heater 18 also reduces the maximum width of gap G between heater 18 and probe head 12. The thermal conductivity between heater 18 and probe head 12, along with a properly-sized gap G through which braze material flows, results in improved and successful brazing of heater 18 to probe head 12.

Figure 3:
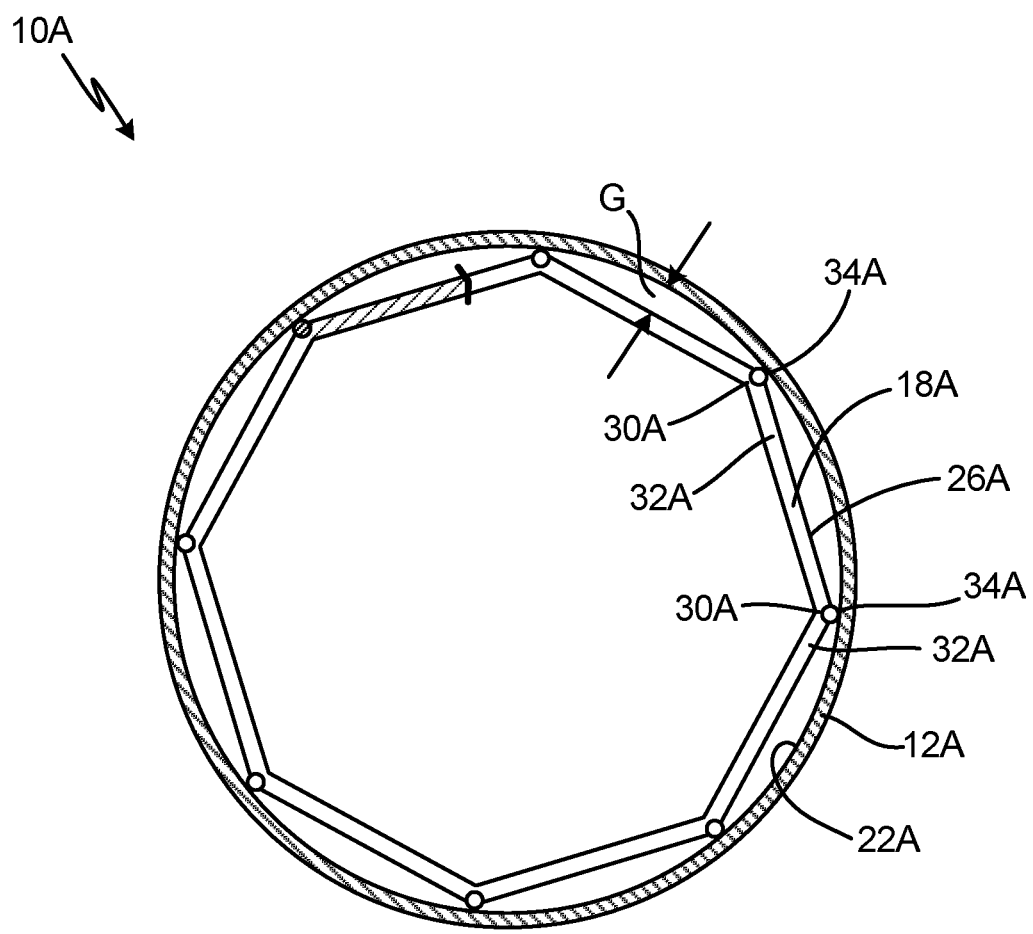
FIG. 3 is a cross-sectional view of an air data probe showing a polygonal heater of the air data probe prior to brazing and having protrusions that are a series of metallic balls.

FIG. 3 is a cross-sectional view of air data probe 10A showing polygonal heater 18A of air data probe 10A prior to brazing and having protrusions 34A that are a series of metallic balls. All other interior components have been omitted for clarity. Air data probe 10A includes probe head 12A and heater 18A. Probe head 12A includes interior surface 22A. Heater 18A includes peripheral surface 26A, points 30A, straight portions 32A, and protrusions 34A.

Probe head 12A has the same structure and function as described in reference to probe head 12 in FIG. 2A. Heater 18A has the same structure and function as described in reference to heater 18 in FIG. 2A except that protrusions 34A are a series of metallic balls. Each protrusion 34A, or metallic ball, is positioned on and connected to peripheral surface 26A of a point 30A of the series of points 30 of polygonal heater 18A. As such, protrusions 34A of heater 18A are defined by the metallic balls. Protrusions 34A may be made of silver or any other suitable metal. Protrusions 34A make direct physical contact with interior surface 22A of probe head 12A. As such, protrusions 34A create, or define, contact, or points or lines of interference, between heater 18A and probe head 12A prior to brazing heater 18A to probe head 12A. As a result, a maximum width of gap G is formed between peripheral surface 26A of a middle of straight portion 32A of heater 18A and interior surface 22A of probe head 12A prior to brazing. A maximum width of gap G is between about 0.001 inch (25.4 microns) and about 0.003 inch (76.2 microns), and is preferably about 0.001 inch (25.4 microns). Gap G is completely filled by braze material after brazing heater 18A to probe head 12A, as described in reference to FIGS. 2A-2C.

Protrusions 34A may be brazed to peripheral surface 26A of heater 18A after heater 18A has been shaped on mandrel 36 (shown in FIG. 2B). Protrusions 34A may also be additively manufactured onto heater 18A or connected to heater 18A via any other suitable connection process. Protrusions 34A allow for heater 18A to slide more easily into probe head 12A. Protrusions 34A made of silver are tribologically superior, acting as dry bearings that allow heater 18A to slide more readily into probe head 12. Silver protrusions 34A may also be readily consumed during the brazing process.

Figure 4:
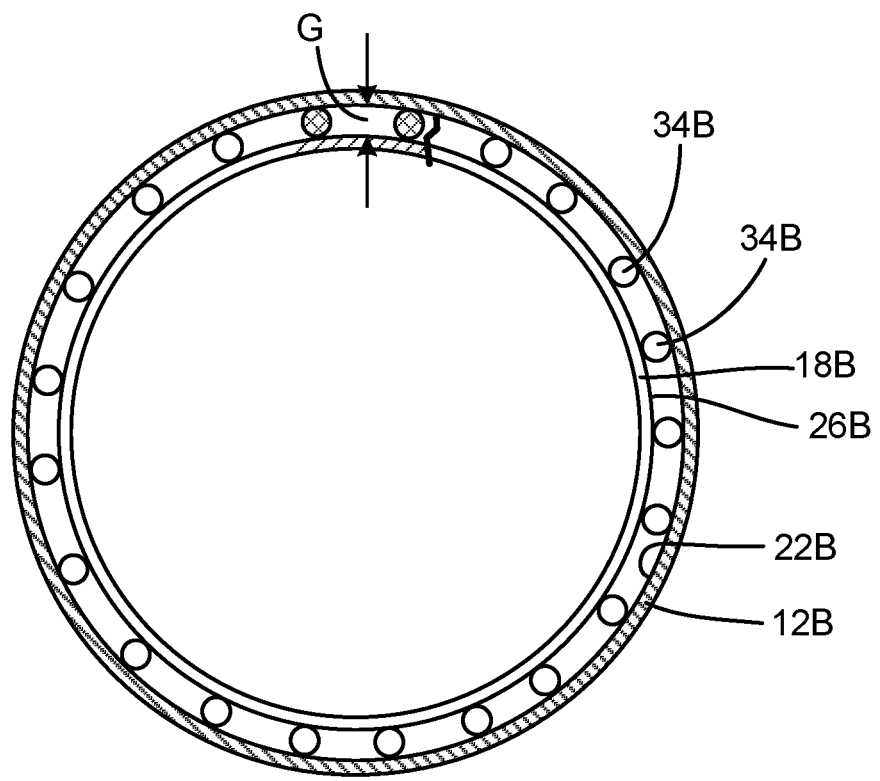
FIG. 4 is a cross-sectional view of an air data probe showing a coiled heater of the air data probe prior to brazing and having protrusions that are a series of metallic balls.

FIG. 4 is a cross-sectional view of air data probe 10B showing coiled heater 18B of air data probe 10B prior to brazing and having protrusions 34B that are a series of metallic balls. All other interior components have been omitted for clarity. Air data probe 10B includes probe head 12B and heater 18B. Probe head 12B includes interior surface 22B. Heater 18B includes peripheral surface 26B and protrusions 34B.

Probe head 12B has the same structure and function as described in reference to probe head 12 in FIG. 2A. Heater 18B has the same structure and function as described in reference to heater 18A in FIG. 3 except that heater 18B does not have points 30A and straight portions 32A, but is coiled with an annular peripheral surface 26B. In this embodiment, heater 18B has a circular cross-sectional profile. In alternate embodiments, heater 18B may have an oval cross-sectional profile or any other suitable curved cross-sectional profile. Protrusions 34B are a series of spaced apart metallic balls positioned on and connected to curved peripheral surface 26B of cylindrical heater 18B. As such, protrusions 34B of heater 18B are defined by the metallic balls, which make direct physical contact with interior surface 22B of probe head 12B. As such, protrusions 34B create, or define, contact, or points or lines of interference between heater 18B and probe head 12B prior to brazing heater 18B to probe head 12B. Protrusions 34B may be made of silver or any other suitable metal. Gap G is formed between peripheral surface 26B of heater 18B and interior surface 22B of probe head 12B prior to brazing. A maximum width of gap G is formed between peripheral surface 26B of heater 18B and interior surface 22B of probe head 12B. A maximum width of gap G is between about 0.001 inch (25.4 microns) and about 0.003 inch (76.2 microns), and is preferably about 0.001 inch (25.4 microns). Gap G is completely filled by braze material after brazing heater 18B to probe head 12B, as described in reference to FIGS. 2A-2C.

Protrusions 34A may be brazed to peripheral surface 26B of heater 18B after heater 18B has been shaped on a mandrel. Protrusions 34B may also be additively manufactured onto heater 18B or connected to heater 18B via any other suitable connection process. Heater 18B can be shaped on a standard circular mandrel. However, circular heater 18B is not required to meet or match up to circular interior surface 22B of probe head 12B, which can be difficult. Rather, protrusions 34B form a plurality of high spots between heater 18B and interior surface 22B of probe head 12B to form an interference fit. Protrusions 34B also form gap G with a maximum width in the desired range, enabling flow of the braze material. Protrusions 34B allow heater 18B to slide into probe head 12B more easily and results in a sufficient number of points or lines of contact to allow for thermal conductivity and proper brazing. Protrusions 34B made of silver slide more readily into probe head 12B for easier and faster installation, and may also be readily consumed during the brazing process.

Figure 5:
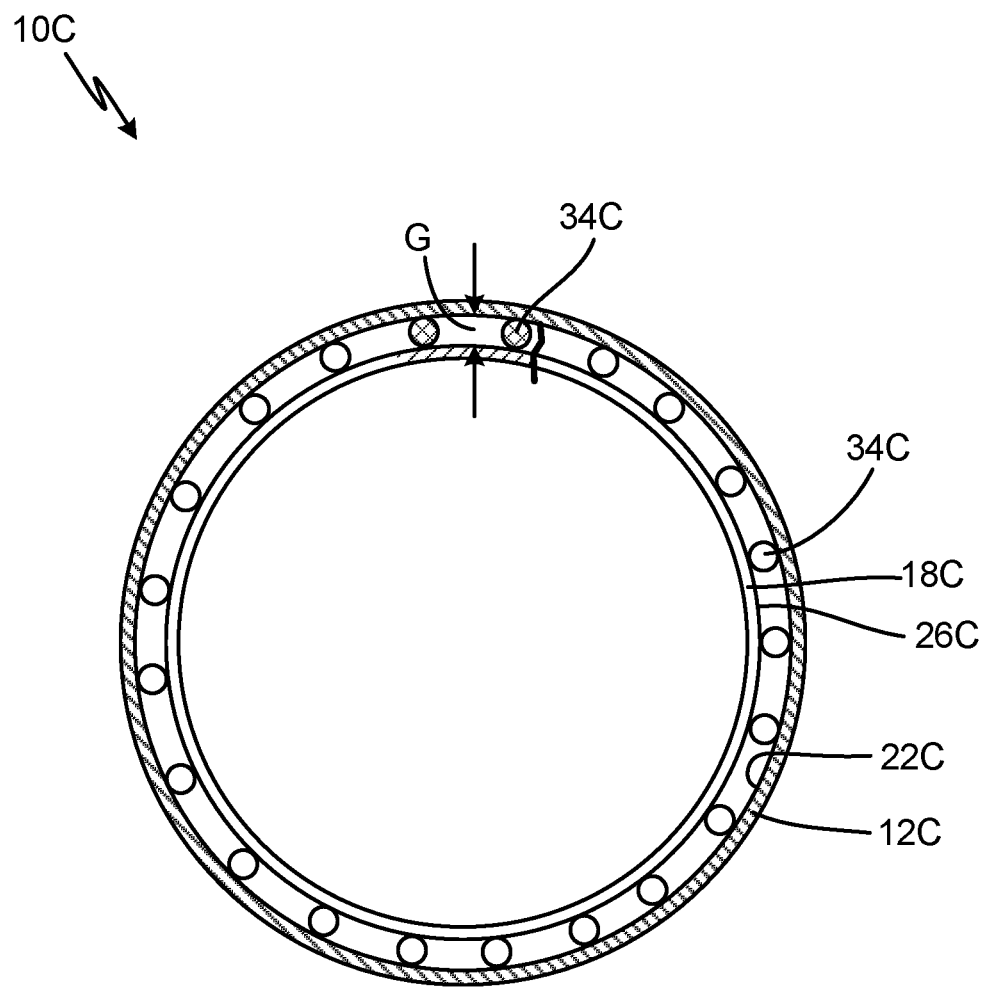
FIG. 5 is a cross-sectional view of an air data probe showing a heater of the air data probe prior to brazing and a probe head of the air data probe having protrusions that are a series of metallic balls.

FIG. 5 is a cross-sectional view of air data probe 10C showing heater 18C of air data probe 10C prior to brazing and probe head 12C of air data probe 10C having protrusions 34C that are a series of metallic balls. All other interior components have been omitted for clarity. Air data probe 10C includes probe head 12C and heater 18C. Probe head 12C includes interior surface 22C and protrusions 34C. Heater 18C includes peripheral surface 26C.

Probe head 12C has the same structure and function as described in reference to probe head 12 in FIG. 2A except that protrusions 34C are connected to interior surface 22C of probe head 12C. Protrusions 34C are a series of spaced apart metallic balls positioned on interior surface 22C of probe head 12C. Protrusions 34C may be made of silver or any other suitable metal. As such, protrusions 34C of probe head 12C are defined by the metallic balls, which make direct physical contact with peripheral surface 26C of heater 18C. Heater 18C has the same structure and function as described in reference to heater 18B in FIG. 4 except heater 18C does not include protrusions. As such, protrusions 34C create, or define, contact, or points or lines of interference, between heater 18C and probe head 12C prior to brazing heater 18C to probe head 12C. A maximum width of gap G is formed between peripheral surface 26C of heater 18C and interior surface 22C of probe head 12C prior to brazing. A maximum width of gap G is between about 0.001 inch (25.4 microns) and about 0.003 inch (76.2 microns), and is preferably about 0.001 inch (25.4 microns). Gap G is completely filled by braze material after brazing heater 18C to probe head 12C, as described in reference to FIGS. 2A-2C.

Protrusions 34C may be brazed to interior surface 22C of probe head 12C. Protrusions 34C may also be additively manufactured onto interior surface 22C of probe head 12C or connected to probe head 12C via any other suitable connection process. Protrusions 34C are formed on interior surface 22C before heater 18C is inserted into probe head 12C. Heater 18C can have a standard shape while protrusions 34C form a plurality of high spots between heater 18C and interior surface 22C of probe head 12C to form an interference fit. Protrusions 34C also form gap G with a maximum width in the desired range, enabling flow of the braze material. Protrusions 34C allow heater 18C to slide into probe head 12C more easily and result in a sufficient number of points or lines of contact to allow for thermal conductivity and proper brazing. Protrusions 34C made of silver allow heater 18C to slide more readily into probe head 12C for easier and faster installation, and may also be readily consumed during the brazing process.

Figure 6:
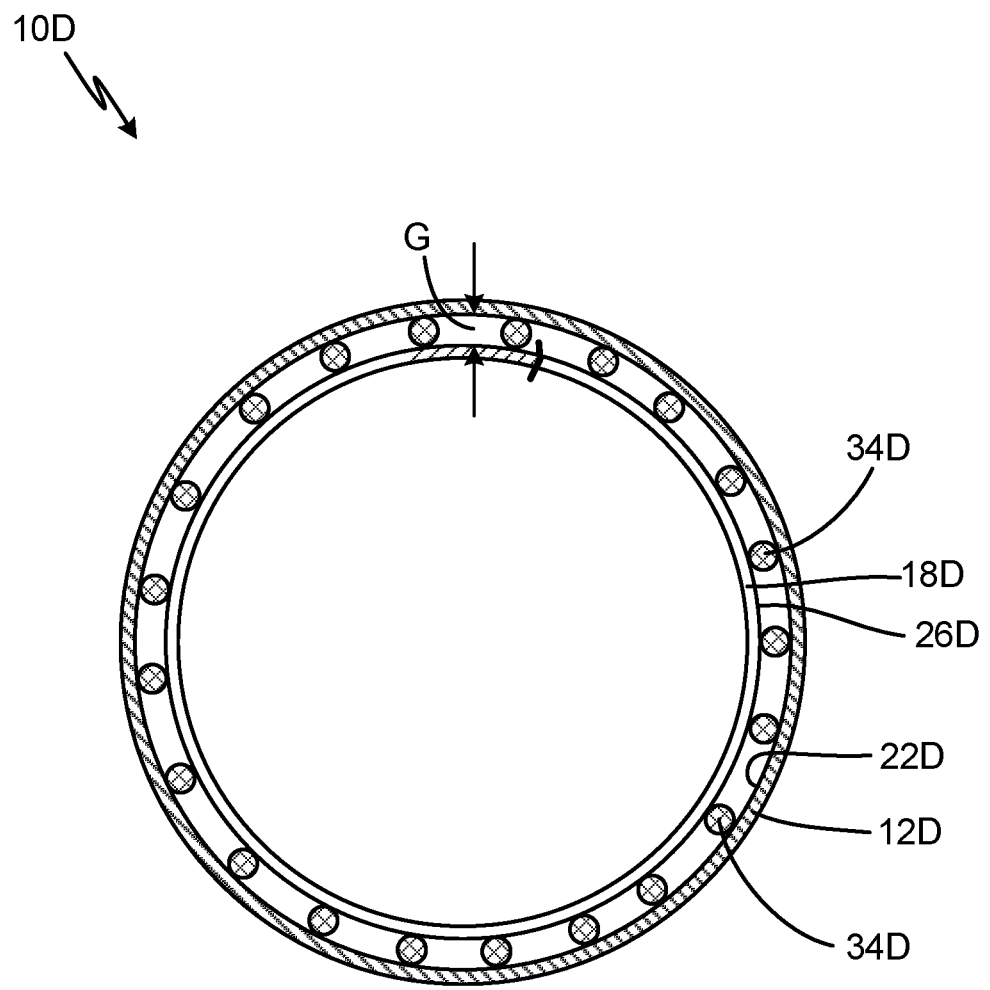
FIG. 6 is a cross-sectional view of an air data probe showing a heater of the air data probe prior to brazing and a probe head of the air data probe having protrusions that are metallic rods.

FIG. 6 is a cross-sectional view of air data probe 10D showing heater 18D of air data probe 10D prior to brazing and probe head 12D of air data probe 10D having protrusions 34D that are metallic rods. All other interior components have been omitted for clarity. Air data probe 10D includes probe head 12D and heater 18D. Probe head 12D includes interior surface 22D and protrusions 34D. Heater 18D includes peripheral surface 26D.

Probe head 12D has the same structure and function as described in reference to probe head 12C in FIG. 5 except protrusions 34D are spaced apart metallic rods placed in parallel around interior surface 22D of probe head 12D. As such, protrusions 34D are connected to interior surface 22D of probe head 12D. In this embodiment, metallic rods of protrusions 34D are cylindrical, having a circular cross-sectional profile. In alternate embodiments, metallic rods forming protrusions 34D may have any suitable shape. Protrusions 34D may be made of silver or any other suitable metal. As such, protrusions 34D of probe head 12D are defined by the metallic rods, which make direct physical contact with peripheral surface 26D of heater 18D. Heater 18D has the same structure and function as described in reference to heater 18C in FIG. 5. As such, protrusions 34D create, or define, contact, or points or lines of interference between heater 18D and probe head 12D prior to brazing heater 18D to probe head 18D. A maximum width of gap G is formed between peripheral surface 26D of heater 18D and interior surface 22D of probe head 12D prior to brazing. A maximum width of gap G is between about 0.001 inch (25.4 microns) and about 0.003 inch (76.2 microns), and is preferably about 0.001 inch (25.4 microns). Gap G is completely filled by braze material after brazing heater 18D to probe head 12D, as described in reference to FIGS. 2A-2C.

Protrusions 34D may be brazed to interior surface 22D of probe head 12D. Protrusions 34D may also be additively manufactured onto interior surface 22D of probe head 12D or connected to probe head 12D via any other suitable connection process. Protrusions 34D are formed on interior surface 22D before heater 18D is inserted into probe head 12C. Because protrusions 34D are rods, protrusions 34D can be more quickly and easily connected to interior surface 22D, and protrusions 34D allow for more uniformity within gap G. Heater 18D can have a standard shape while protrusions 34D form a plurality of high spots between heater 18D and interior surface 22D of probe head 12D to form an interference fit. Protrusions 34D also form gap G with a maximum width in the desired range, enabling flow of the braze material. Protrusions 34D allow heater 18D to slide into probe head 12D more easily and result in a sufficient number of points or lines of contact to allow for thermal conductivity and proper brazing. Protrusions 34D made of silver allow heater 18D to slide more readily into probe head 12D for easier and faster installation, and may also be readily consumed during the brazing process.

Figure 7:
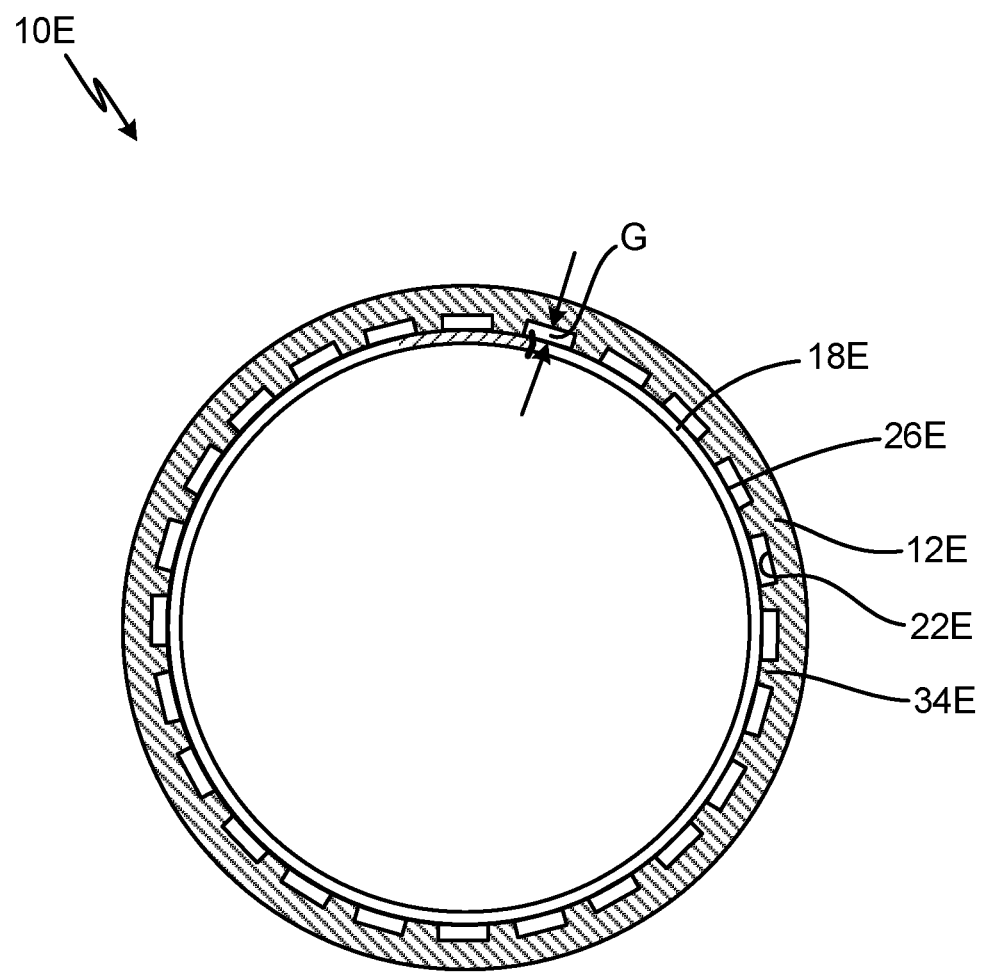
FIG. 7 is a cross-sectional view of an air data probe showing a heater of the air data probe prior to brazing and a probe head of the air data probe having protrusions separated by grooves.

FIG. 7 is a cross-sectional view of air data probe 10E showing heater 18E of air data probe 10E prior to brazing and probe head 12E of air data probe 10E having protrusions 34E separated by grooves. All other interior components have been omitted for clarity. Air data probe 10E includes probe head 12E and heater 18E. Probe head 12E includes interior surface 22E and protrusions 34E. Heater 18E includes peripheral surface 26E.

Probe head 12E has the same structure and function as described in reference to probe head 12D in FIG. 6 except protrusions 34E are spaced apart, parallel, rod-like protrusions formed by grooves machined into interior surface 22E of probe head 12E. As such, protrusions 34E connected to interior surface 22E of probe head 12E are defined by rod-like protrusions 34E separated by grooves, which make direct physical contact with peripheral surface 26E of heater 18E. In this embodiment, protrusions 34E have a rectangular cross-sectional profile. In alternate embodiments, protrusions 34E may have a circular cross-sectional profile or any suitably shaped cross-sectional profile. Protrusions 34E may be made of silver or any other suitable metal. Heater 18E has the same structure and function as described in reference to heater 18C in FIG. 5. As such, protrusions 34E create, or define, contact, or points or lines of interference, between heater 18E and probe head 12E prior to brazing heater 18E to probe head 18E. A maximum width of gap G is formed between peripheral surface 26E of heater 18E and interior surface 22E of probe head 12E prior to brazing. A maximum width of gap G is between about 0.001 inch (25.4 microns) and about 0.003 inch (76.2 microns), and is preferably about 0.001 inch (25.4 microns). Gap G is completely filled by braze material after brazing heater 18E to probe head 12E, as described in reference to FIGS. 2A-2C.

Protrusions 34E may be formed by machining grooves into interior surface 22E of probe head 12E. Protrusions 34E may also be additively manufactured onto interior surface 22E of probe head 12E. Protrusions 34E are formed on interior surface 22E before heater 18E is inserted into probe head 12E. Because protrusions 34E are formed as part of interior surface 22E, protrusions 34E are easier to manufacture. Protrusions 34E also allow for more uniformity within gap G. Heater 18E can have a standard shape while protrusions 34E form a plurality of high spots between heater 18E and interior surface 22E of probe head 12E to form an interference fit. Protrusions 34E also form gap G with a maximum width in the desired range, enabling flow of the braze material. Protrusions 34E allow heater 18E to slide into probe head 12E more easily and result in a sufficient number of points or lines of contact to allow for thermal conductivity and proper brazing.

DISCUSSION OF POSSIBLE EMBODIMENTS

The following are non-exclusive descriptions of possible embodiments of the present invention.

An air data probe includes a probe head having an interior surface defining a cavity; a component positioned within the cavity of the probe head; a plurality of protrusions defining contact between the interior surface of the probe head and a peripheral surface of the component prior to brazing the component to the probe head; and a braze material located between the interior surface of the probe head and the peripheral surface of the component as a result of brazing the component to the probe head.

The air data probe of the preceding paragraph can optionally include, additionally and/or alternatively, any one or more of the following features, configurations and/or additional components:

A gap between the interior surface of the probe head and the peripheral surface of the component prior to brazing the component to the probe head, a maximum width of the gap being less than or equal to about 0.003 inch (76.2 microns), wherein the gap is completely filled by the braze material after brazing the component to the probe head.

The component is a heater comprising a helical heating element having a series of points between straight portions, the points defining the protrusions.

The component is a heater comprising a helical heating element having a series of points between straight portions, and wherein the protrusions are metallic balls connected to the peripheral surface of the heater at the points.

The protrusions are attached to the peripheral surface of the component.

The protrusions are metallic balls.

The protrusions are made of silver.

The protrusions are connected to the interior surface of the probe head, the protrusions being configured to contact the peripheral surface of the component.

The protrusions are metallic balls.

The protrusions are metallic rods.

The protrusions are separated by grooves in the interior surface of the probe head.

The protrusions are additively manufactured on the interior surface of the probe head.

The plurality of protrusions defining contact between the interior surface of the probe head and a peripheral surface of the component are configured to allow both the probe head and the component to attain a same temperature to support the brazing.

A method for connecting a component of an air data probe to an interior surface of a probe head of the air data probe includes sliding the component into a cavity of the probe head such that a plurality of protrusions define contact between a peripheral surface of the component and an interior surface of the probe head; and brazing the component to the probe head to join an entirety of the peripheral surface of the component to the probe head.

The method of the preceding paragraph can optionally include, additionally and/or alternatively, any one or more of the following features, configurations and/or additional components:

The component is a heater and further including shaping the heater of the probe head by wrapping the heater along a mandrel to form a heater having points, the points defining the protrusions.

Brazing protrusions to the peripheral surface of the component before sliding the component into the cavity of the probe head.

Brazing protrusions to the interior surface of the probe head before sliding the component into the cavity of the probe head.

The protrusions are metallic balls or metallic rods.

The plurality of protrusions defining contact between the interior surface of the probe head and a peripheral surface of the component are configured to allow both the probe head and the component to attain a same temperature to support the brazing.

Machining grooves into an interior surface of the probe head to form protrusions before sliding the component into the cavity of the probe head.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
a probe head having an interior surface defining a cavity;
a heater positioned within the cavity of the probe head, the heater comprising a helical heating element having a series of points between straight portions, the points contacting the interior surface of the probe head prior to brazing the heater to the probe head; and a braze material located between the interior surface of the probe head and a peripheral surface of the heater as a result of brazing the heater to the probe head.

2. The air data probe of claim 1, further including a gap between the interior surface of the probe head and the peripheral surface of the heater prior to brazing the heater to the probe head, a maximum width of the gap being less than or equal to 0.003 inch (76.2 microns), wherein the gap is completely filled by the braze material after brazing the heater to the probe head.

3. The air data probe of claim 1, wherein the points are configured to allow both the probe head and the heater to attain a same temperature to support the brazing.

4. The air data probe of claim 1, wherein the heater has a polygonal cross-sectional profile.

5. The air data probe of claim 4, wherein the heater has an octagonal cross-sectional profile.

\* \* \* \* \*